US010584262B2

(12) United States Patent
Berger et al.

(10) Patent No.: US 10,584,262 B2
(45) Date of Patent: Mar. 10, 2020

(54) RADIATION CURABLE COATING COMPOSITION BASED ON CHAIN-EXTENDED AND CROSS-LINKED POLYURETHANES

(71) Applicant: BASF SE, Ludwigshafen (DE)

(72) Inventors: Sebastian Berger, Ann Arbor, MI (US); Peter Thuery, Ludwigshafen (DE); Susanne Neumann, Speyer (DE); Christine Roesch, Mainz (DE); Uwe Burkhardt, Ludwigshafen (DE); Katharina Andes, Maxdorf (DE); Stefan Wahl, Ludwigshafen (DE); Manfred Biehler, Ilbesheim (DE); Sebastian Roller, Mannheim (DE)

(73) Assignee: BASF SE, Ludwigshafen (DE)

( * ) Notice: Subject to any disclaimer, the term of this patent is extended or adjusted under 35 U.S.C. 154(b) by 208 days.

(21) Appl. No.: 15/537,103

(22) PCT Filed: Dec. 7, 2015

(86) PCT No.: PCT/EP2015/078821
§ 371 (c)(1),
(2) Date: Jun. 16, 2017

(87) PCT Pub. No.: WO2016/096503
PCT Pub. Date: Jun. 23, 2016

(65) Prior Publication Data
US 2019/0112500 A1  Apr. 18, 2019

(30) Foreign Application Priority Data

Dec. 17, 2014 (EP) ..................... 14198469

(51) Int. Cl.
| | |
|---|---|
| C08F 2/48 | (2006.01) |
| C08F 2/46 | (2006.01) |
| C08F 2/50 | (2006.01) |
| C08G 61/04 | (2006.01) |
| C09D 175/14 | (2006.01) |
| C08G 18/66 | (2006.01) |
| C08G 18/75 | (2006.01) |
| C08G 18/10 | (2006.01) |
| C08G 18/32 | (2006.01) |
| C08G 18/34 | (2006.01) |
| C08G 18/08 | (2006.01) |
| C08G 18/67 | (2006.01) |
| C08G 18/18 | (2006.01) |
| C08G 18/42 | (2006.01) |

(52) U.S. Cl.
CPC ....... C09D 175/14 (2013.01); C08G 18/0823 (2013.01); C08G 18/10 (2013.01); C08G 18/1808 (2013.01); C08G 18/1816 (2013.01); C08G 18/325 (2013.01); C08G 18/3206 (2013.01); C08G 18/341 (2013.01); C08G 18/348 (2013.01); C08G 18/4238 (2013.01); C08G 18/664 (2013.01); C08G 18/6659 (2013.01); C08G 18/675 (2013.01); C08G 18/755 (2013.01); C08G 18/758 (2013.01)

(58) Field of Classification Search
CPC ................ C09D 175/14; C08G 18/341; C08G 18/4238; C08G 18/1816; C08G 18/6659; C08G 18/3206; C08G 18/755; C08G 18/348; C08G 18/18; C08G 18/1808; C08G 18/664; C08G 18/675; C08G 18/758; C08G 18/325; C08G 18/3234; C08G 18/0823
USPC ........ 427/508, 487, 457; 522/71, 64, 6, 189, 522/184, 1; 520/1
See application file for complete search history.

(56) References Cited

U.S. PATENT DOCUMENTS

| | | | | |
|---|---|---|---|---|
| 2009/0270581 | A1* | 10/2009 | Tielemans | ......... C08G 18/0823 528/59 |
| 2011/0086180 | A1* | 4/2011 | Tielemans | ........... C08G 18/675 427/487 |
| 2013/0316098 | A1* | 11/2013 | Lubnin | ............... C08F 283/006 428/32.16 |
| 2015/0225606 | A1* | 8/2015 | Berger | ............... C08G 18/6659 428/425.1 |
| 2017/0226377 | A1* | 8/2017 | Jahns | ...................... C08K 3/00 |

FOREIGN PATENT DOCUMENTS

| | | |
|---|---|---|
| DE | 196 18 720 A1 | 11/1996 |
| DE | 198 26 712 A1 | 12/1999 |
| DE | 199 13 353 A1 | 9/2000 |

(Continued)

OTHER PUBLICATIONS

Extended European Search Report dated Jul. 6, 2015 in Patent Application No. 14198469.0.
International Preliminary Report on Patentability and Written Opinion dated Jun. 29, 2017 in PCT/EP2015/078821(submitting English translation only).
International Search Report and Written Opinion dated Feb. 11, 2016 in PCT/EP2015/078821 (submitting English translation only).
Werner J. Blank, et al., "Catalysis of the Isocyanate-Hydroxyl Reaction by Non-Tin Catalysts", Progress in Organic Coatings, vol. 35, 1999, pp. 19-29.

(Continued)

*Primary Examiner* — Jessica Whiteley
(74) *Attorney, Agent, or Firm* — Oblon, McClelland, Maier & Neustadt, L.L.P.

(57) ABSTRACT

The invention relates to aqueous polyurethane dispersions that are curable with UV radiation. The polyurethanes are chain-extended with aromatic, cycloaliphatic or aliphatic diamine compound and cross-linked with aliphatic triamine compound. The polyurethanes are useful dispersions for coating various substrates. The use of the invented dispersions results in high hardness, very good flexibility and good chemical resistance in both clear coats and pigmented coatings before and after UV curing combined with very good adhesion to different substrates.

14 Claims, No Drawings

(56) References Cited

FOREIGN PATENT DOCUMENTS

| | | |
|---|---|---|
| DE | 199 57 900 A1 | 6/2001 |
| EP | 0 007 508 A2 | 2/1980 |
| EP | 0 057 474 A2 | 8/1982 |
| EP | 0 495 751 A1 | 7/1992 |
| EP | 0 615 980 A2 | 9/1994 |
| EP | 2 316 867 A1 | 5/2011 |
| WO | WO 98/33761 A1 | 8/1998 |
| WO | WO 00/39183 A1 | 7/2000 |
| WO | WO 03/035596 A2 | 5/2003 |
| WO | WO 2004/029121 A1 | 4/2004 |
| WO | WO 2004/076519 A1 | 9/2004 |
| WO | WO 2004/076520 A1 | 9/2004 |
| WO | WO 2009/147092 A1 | 12/2009 |
| WO | WO 2012/171833 A1 | 12/2012 |
| WO | WO 2014/063920 A1 | 5/2014 |
| WO | WO-2014063920 A1 * | 5/2014 ......... C08G 18/6659 |

OTHER PUBLICATIONS

J.P. Kennedy, et al., "Correlation Between Cationic Model and Polymerization Reactions of Olefins", Advances in Polymer Science, vol. 14, 1974, 48 Pages.

* cited by examiner

RADIATION CURABLE COATING COMPOSITION BASED ON CHAIN-EXTENDED AND CROSS-LINKED POLYURETHANES

The present invention relates to aqueous polyurethane dispersions that are curable with UV radiation, to a process for preparing them, and to the use thereof.

For the coating of wood materials, as in the furniture industry, for instance, radiation-curable polyurethanes are widespread. In addition to requirements, such as high hardness, coatings in the furniture industry are required in particular to emphasize the visibility of wood structure, an effect referred to as "grain enhancement" or "grain highlighting" for clear coats. Today, requirements for waterborne UV-coatings for wood applications increasingly focus on pigmented coatings. Very good physical drying properties are essential in order to obtain a thorough hardening and complete curing of pigmented waterborne UV-coatings. According to a current trend in the market, systems are needed suitable for use of water-borne UV applications, 1K (single stage) applications, and/or 2K (two stages) applications.

WO 2009/147092 discloses water-borne UV-curable dispersions and polyamines as active chain-extenders, such as polyamines of the type 1,2-ethylenediamine, piperazine, isophorone diamine and others. Various cross-linking agents, such as polycarbodiimides and polyepoxides, are also mentioned.

Object of the present invention is the development of water-borne UV-curable dispersions with improved hardness before and after UV-curing that result from very good physical drying properties of the coatings. High double bond densities are not required in the system to obtain the desired hardness. The use of the invented dispersions results in high hardness, very good flexibility and good chemical resistance in both clear coats and pigmented coatings before and after UV curing combined with very good adhesion to different substrates.

The object of the invention is achieved by the combination of a very good physical drying UV-curable dispersion containing aromatic chain segments that result in improved hardness of the coating, even before UV curing. Furthermore, an efficient chain extension is obtained with a mixture of at least one aromatic, cycloaliphatic or aliphatic diamine compound; an additional internal cross-linking with at least one aliphatic triamine compound produces a partly dense gel-network. Target is it to use the invented resin for either 1K (single stage), 2K (two stage) or UV applications.

The need for offering "environmental friendly" products becomes increasingly important today and enhances attractiveness of the product. The composition of the invented dispersion and the process for its preparation are advantageous providing dispersions with low volatile organic content (VOC), a high solid content and low viscosity. The dispersion according to this invention is label-free according global harmonized system (GHS). Reduction of skin and eye irritations enhances the safe handling of the dispersion and generates a value added asset for the user.

The invention relates to an aqueous, radiation curable coating composition which comprises A) At least one water-dispersible polyurethane component composed of the constituents:

A1) At least one aromatic, cycloaliphatic or aliphatic diisocyanate or polyisocyanate compound in an amount suitable for effecting polymerization;

A2) At least one ethylenically unsaturated compound that contains at least two reactive groups capable of reacting with isocyanate groups;

A3) At least one hydrophilic carboxylic acid that contains at least one reactive group capable of reacting with isocyanate groups and effecting dispersion of the polyurethane component A) in the aqueous phase;

A4) At least one high molecular weight polyester polyol compound;

A5) At least one low molecular weight alcohol that has at least two hydroxy functions;

A6) At least one polyfunctional diamine compound; and

A7) At least one polyfunctional polyamine compound that has at least three amino groups; and B) Water.

The polyurethane A) component of the coating composition of the invention exhibits good physical drying properties yielding in a tack-free and hard coating before UV curing, which is suitable to used especially for pigmented coatings, especially for difficult to cure pigments.

The above-described polyurethanes A) and mixtures thereof can be used with particular advantage as materials for coating wood and wood-containing substrates.

The term aqueous radiation curable coating composition comprises within its scope the above-mentioned coating composition which is curable by exposure to UV-radiation. In that event, a reactive component acting as a photoinitiator is present in the composition.

The term aqueous radiation curable coating composition also comprises within its scope the above-mentioned coating composition which has been subjected to UV-curing. In that event, the decomposition product of the reactive photoinitiator component is present in the composition, as cured.

In one preferred embodiment the polyurethane components, as defined above, have a double bond density of at least 1.2 mol/kg, preferably at least 1.4, and most preferably 1.5 mol/kg.

The water-dispersible polyurethane component A) is based on the following monomeric or oligomeric constituents:

Constituent A1)

Constituent A1) consists of at least one, as for example one to three, preferably one to two, and more preferably exactly one aliphatic di- or polyisocyanate.

According to an alternative embodiment, Constituent A1) consists of at least one, as for example one to three, preferably one to two, and more preferably exactly one aromatic di- or polyisocyanate.

Constituent A1) preferably has an NCO content of 10% to 18%, preferably 12% to 16%, and more preferably 13% to 16% by weight and an average molecular weight of 200 to 1200, preferably 200 to 1000 and more preferably of 200 to 900 g/mol.

Aliphatic isocyanates are those which exclusively contain isocyanate groups attached to those carbon atoms which are part of linear or branched, acyclic chains, preferably those containing exclusively isocyanate groups which are attached to linear or branched, acrylic chains and more preferably those which have isocyanate groups attached exclusively to linear or branched, acyclic hydrocarbon chains.

Aliphatic diisocyanates or polyisocyanates are preferably isocyanates having 4 to 20 C-atoms. Examples of customary diisocyanates are tetramethylene 1,4-diisocyanate, pentamethylene 1,5-diisocyanate, hexamethylene 1,6-diisocyanate, 2-methyl-1,5-diisocyanatopentane, octa-methylene 1,8-diisocyanate, decamethylene 1,10-diisocyanate, dodecamethylene 1,12-diiso-cyanate, tetradecamethylene 1,14-diisocyanate, 2,2,4- and 2,4,4-trimethylhexane diisocyanate, 1,3-bis (1-isocyanato-1-methylethyl)benzene (m-TMXDI), and derivatives of lysine diisocyanate. Mixtures of said diisocyanates may be present, too.

The polyisocyanates may be monomeric isocyanates having more than two isocyanate groups or oligomers of the abovementioned diisocyanates.

An example of the former is triisocyanatononane (4-isocyanatomethyloctane 1,8-diisocyanate) or 2'-isocyanatoethyl (2,6-diisocyanatohexanoate).

Examples of the latter are oligomers which contain isocyanurate, biuret, uretdione, allophanate, iminooxadiazinetrione and/or carbodiimide groups and which are obtainable by oligomerizing at least one, preferably exactly one, abovestated diisocyanate, more preferably by reaction of hexamethylene 1,6-diisocyanate.

The above-mentioned Constituents A 1) are known or can be prepared by known methods, e.g. such as the ones known from WO 00/39183 A1, particularly Example 1.1 and the products 1 to 7 listed in Table 1 therein.

According to an alternative embodiment, Constituent A1) consists of cycloaliphatic or aromatic, di- or polyisocyanates. According to a preferred embodiment polyisocyanates present in Constituent A 1) do not include any polyisocyanates in which the isocyanate groups have been reacted with a blocking agent.

Such polyisocyanates have an NCO functionality of 2.0 to 4.5, more preferably 2.0 to 3.5. In another embodiment, Constituent A 1) is based on compounds which in addition to two or more isocyanate groups also have a group selected from the group consisting of urethane, urea, biuret, allophanate, carbodiimide, urethonimine, urethdione, and isocyanurate groups.

Cycloaliphatic isocyanates are those which have at least one isocyanate group that is connected to a carbon atom that is part of a fully saturated ring system, preferably those which have at least one isocyanate group that is bonded to a carbon atom that is part of a nonaromatic carbocyclic group.

Aromatic isocyanates are those which have at least one isocyanate group which is connected to a carbon atom which is part of an aromatic group.

Examples of cycloaliphatic diisocyanates are 1,4-, 1,3-, or 1,2-diisocyanatocyclohexane, 4,4'- or 2,4'-di(isocyanatocyclohexyl)methane, isophorone diisocyanate, 1,3- or 1,4-bis (isocyanatomethyl)cyclohexane, 2,4- and 2,6-diisocyanato-1-methylcyclohexane. Examples of aromatic diisocyanates are 2,4- or 2,6-tolylene diisocyanate, m- or p-xylylene diisocyanate, 2,4'- or 4,4'-diisocyanatodiphenylmethane, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethyldiphenyl diisocyanate, 3-methyldiphenylmethane 4,4'-diisocyanate, and diphenyl ether 4,4'-diisocyanate. Mixtures of the abovementioned diisocyanates may be present.

Preferred Examples as Constituent A 1) are isophorone diisocyanate, 4,4'- or 2,4'-di(isocyanatocyclohexyl)methane, their isocyanurates, biurets, and mixtures thereof.

Isophorone diisocyanate is usually in the form of a mixture, specifically a mixture of the cis- and trans-isomers, generally in a ratio of about 60:40 to 80:20 (w/w), preferably in a ratio of about 70:30 to 75:25, and more preferably in a ratio of about 75:25.

Constituents A 1) based on cycloaliphatic or aromatic, di- or polyisocyanates are known or can be prepared by known methods.

Products containing same preferred constituents A 1) are commercially available as aqueous dispersions, such as the ones marketed under the trade mark designation Laromer® (BASF SE Germany), particularly the products LAROMER LR 8949, UA 9060, LR 9005, LR 8963 and UA 9059, such as the ones marketed under the trade mark designation Bayhydrol® (Bayer Material Science AG, Germany), particularly the products BAYHYDROL UV 2280, UV 2282, UV 2317 and UV 2689, such as the ones marketed under the trade mark designation Neorad® (DSM Coating Resins, LLC), particularly the products NEORAD R-441, R-448, UV-14, UV-20 and UV-65, such as the ones marketed by Alberdingk Boley under the designation ALBERDINGK® LUX, particularly the products LUX 399, 255, 250 and 260 VP, or the products marketed under the trade mark designation Ucecoat® (Annex), particularly the products UCECOAT 7177, 7699, 7733, 7710, 7689 and 7788.

Constituent A 2)

Constituent A2) consists of at least one ethylenically unsaturated compound that contains at least two reactive groups capable of reacting with isocyanate groups.

Such compounds are preferably reaction products of glycidyl ethers with (meth)acrylic acid.

Among the suitable ones considered are, for example, glycidyl ethers of aliphatic or aromatic polyols. Products of this type are available commercially in a great variety. Particularly preferred are polyglycidyl compounds of the bisphenol A, F, or B type, their fully hydrogenated derivatives, and glycidyl ethers of polyhydric alcohols, as for example of 1,4-butanediol, 1,4-cyclohexanedimethanol, and neopentyl glycol, 1,6-hexanediol, of glycerol, trimethylolpropane, and of pentaerythritol. Examples of polyepoxide compounds of these kinds are Epikote® 812 (epoxide value: about 0.67 mol/100 g) and Epikote® 828 (epoxide value: about 0.53 mol/100 g). Epikote® 1001, Epikote®, 1007, and Epikote® 162 (epoxide value: about 0.61 mol/100 g) from Resolution Performance Products, Rütapox® 0162 (epoxide value: about 0.58 mol/100 g), and Araldit® DY 0397 (epoxide value: about 0.83 mol/100 g) from Huntsman Switzerland.

Preferred are bisphenol A diglycidyl ether and 1,4-butanediol diglycidyl ether, particularly bisphenol A diglycidyl ether.

A suitable Constituent A 2) is particularly an epoxy (meth)acrylate of the formula

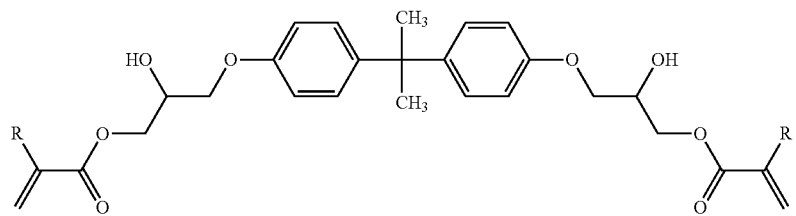

in which R is hydrogen or methyl, preferably hydrogen.

Constituent A 3)

Constituent A 3) is defined as carboxylic acid of hydrophilic character that contains at least one reactive group capable of reacting with isocyanate groups and effects dispersion of the polyurethane component A) in the aqueous phase.

Such compound according to Constituent A 3) is at least one, preferably exactly one, compound having at least one, as for example one to three, preferably one or two, more preferably exactly two, functional groups that are reactive toward isocyanate groups, and having at least one, preferably precisely one, carboxylic group.

Suitable compounds having at least one isocyanate-reactive group and also at least one carboxylic group include, in particular, aliphatic monohydroxy, and monoamino and imino carboxylic acid, such as hydroxyacetic acid (glycolic acid), hydroxypropionic acid (lactic acid), hydroxysuccinic acid, hydroxypivalic acid, dimethylolpropionic acid, dimethylolbutyric acid, hydroxydecanoic acid, hydroxydodecanoic acid, 12-hydroxystearic acid and N-(2'-aminoethyl)-3-aminopropionic acid or iminodiacetic acid.

Preference is given to glycolic acid, dimethylolpropionic acid and dimethylolbutyric acid with particular preference to glycolic acid and dimethylolpropionic acid.

Constituent A 4)

Constituent A 4) is defined as a high molecular weight polyester polyol compound. Preferred are polyester polyols having a weight-average molar mass Mw of 700 to 4000, preferably 1000 to 3000 g/mol, preferably having an acid number to DIN 53240 of not more than 20 mg KOH/g.

Preferably this is a polyesterdiol synthesized, at least partly from aliphatic diol and/or dicarboxylic acid building blocks. The dicarboxylic acid building blocks may be the free acids or derivatives thereof.

Aliphatic building blocks have only open chains, preferably alkylene chains, whereas cycloaliphatic building blocks have at least one ring system apart from the functional groups. Aromatic building blocks have at least one aromatic ring system apart from the functional groups.

Dials used with preference are ethylene glycol, 1,2- or 1,3-propanediol, 1,4-butanediol, 1,5-pentanediol, neopentyl glycol, 1,6-hexanediol, and 1,8-octanediol.

Examples of cycloaliphatic diols are 1,2- and 1,3-cyclopentanediol, 1,2-, 1,3-, and 1,4-cyclohexanediol, 1,1-, 1,2-, 1,3- and 1,4-bis(hydroxymethyl)cyclohexane, 1,1-, 1,2-, 1,3-, and 1,4-bis(hydroxyethyl)cyclohexane, and bis(4-hydroxycyclohexane)isopropylidene.

Examples of aliphatic dicarboxylic acids are oxalic acid, malonic acid, maleic acid, fumaric acid, succinic acid, glutaric acid, adipic acid, pimelic acid, suberic acid, azelaic acid, sebacic acid, undecane-α,ω-dicarboxylic acid, dodecane-α,ω-dicarboxylic acid, and derivatives thereof.

Examples of cycloaliphatic dicarboxylic acids are cis- and trans-cyclohexane-1,2-dicarboxylic acid (hexahydrophthalic acid), cis- and trans-cyclohexane-1,3-dicarboxylic acid, cis- and trans-cyclohexane-1,4-dicarboxylic acid, 1,2-, 1,3-, or 1,4-cyclohex-4-enedicarboxylic acid (tetrahydrophthalic acids), cis- and trans-cyclopentane-1,2-dicarboxylic acid, cis- and trans-cyclopentane-1,3-dicarboxylic acid, and derivatives thereof.

Examples of aromatic dicarboxylic acids are phthalic acid, isophthalic acid, terephthalic acid, and phthalic anhydride. Phthalic acid and isophthalic acid are preferred.

Preferred polyester diols are those polyester dials in which diol and/or dicarboxylic acid components or derivatives thereof for their preparation are at least partly aliphatic; preferably, the diol component is entirely an aliphatic component.

Constituent A 5)

Constituent A 5) is defined as low molecular weight alcohol that has at least two hydroxy functions.

Suitable alcohols comprise at least one, preferably one to three, more preferably one to two, and very preferably precisely one (cyclo)aliphatic, more particularly aliphatic, diol, having a molar mass of less than 700 g/mol, preferably less than 600, more preferably less than 500, and very preferably less than 400 g/mol.

A cycloaliphatic diol is a reference to those diols which comprise at least one saturated carbon ring.

Aliphatic diols are those which comprise exclusively linear or branched chains.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n is ≥4, polyethylene-polypropylene glycols, where the sequence of the ethylene oxide or propylene oxide units may be block wise or random, polytetramethylene glycols, and poly-1,3-propanediols.

Examples of cycloaliphatic diols are 1,2- and 1,3-cyclopentanediol, 1,2-, 1,3-, and 1,4-cyclohexanediol, 1,1-, 1,2-, 1,3-, and 1,4-bis(hydroxymethyl)cyclohexane, 1,1-, 1,2-, 1,3-, and 1,4-bis(hydroxyethyl)cyclohexane, and bis(4-hydroxycyclohexane)isopropylidene.

Preferred diols A 5) are ethylene glycol, 1,2-propanediol, 1,3-propanediol, 2,2-dimethyl-1,2-ethanediol, 2,2-dimethyl-1,3-propanediol (neopentyl glycol), 1,2-butanediol, 1,3-butanediol, 1,4-butanediol, 1,6-hexanediol, or diethylene glycol.

Particularly preferred compounds A 5) are ethylene glycol, 1,2-propanediol, 1,3-propanediol, neopentyl glycol, 1,4- or 1,5-butanediol, 1,6-hexanediol, 1,8-octanediol and diethylene glycol.

Especially preferred compounds A 5) are ethylene glycol, neopentyl glycol, and 1,4-butanediol.

Constituent A 6)

Constituent A 6) is defined as polyfunctional diamine compound that has a preferred molecular weight range from about 32 to 500 g/mol, particularly from about 60 to 300 g/mol, and at least two amino groups, particularly primary or secondary amino groups or a combination of both.

Examples are diamines, such as diaminoethane, diaminopropane, diaminobutane, diaminohexane, piperazine, 2,5-dimethylpiperazine, amino-3-aminomethyl-3,5,5-trimethylcyclohexane (isophoronediamine, IPDA), 4,4'-diaminodicyclo-hexylmethane, 1,4-diaminocyclohexane, aminoethylethanolamine, hydrazine or hydrazine hydrate.

It is assumed that the presence of polyfunctional diamine compounds effects chain extension of pre-polymers formed from the components A 1)-A 5).

Constituent A 7)

Constituent A 7) is defined as polyfunctional polyamine compound that has at least three amino groups. Suitable examples are triamines and polyamines, such as diethylenetriamine (DETA), 1,8-diamino-4-aminomethyloctane, triethylenetetramine, dipropylenetriamine or N,N'-bis(3-aminopropyl)ethylenediamine It is assumed that the presence of polyfunctional triamine compounds effects cross-linking of particles formed from dispersing the pre-polymer consisting of the components A 1)-A 5).

The presence of polyfunctional diamine compounds in combination with polyfunctional triamine compounds effects chain extension and cross-linking of pre-polymers formed from dispersing the pre-polymer consisting of the components A 1)-A 5).

It is preferred to use mixtures of diamines and triamines, especially mixtures of isophoronediamine (IPDA) and diethylenetriamine (DETA).

PREFERRED EMBODIMENTS OF COMPOSITIONS ACCORDING TO THE INVENTION

The invention particularly relates to a coating composition, which comprises
A) At least one water-dispersible polyurethane component composed of the constituents:
  A1) At least one cycloaliphatic diisocyanate or polyisocyanate compound in an amount suitable for effecting polymerization;
  A2) At least one reaction product of glycidyl ethers with (meth)acrylic acid;
  A3) At least one hydrophilic carboxylic acid that contains at least two hydroxy groups;
  A4) At least one high molecular weight polyester polyol compound obtainable by condensation of aliphatic alcohols having two hydroxy functions and aliphatic dicarboxylic acids;
  A5) At least one aliphatic straight chained or branched chained diol compound;
  A6) At least one aromatic, cycloaliphatic or aliphatic diamine compound; and
  A7) At least one aliphatic triamine compound; and
B) Water.

A preferred embodiment of the invention relates to a coating composition, which comprises
A) At least one water-dispersible polyurethane component composed of the constituents:
  A1) Isophorone diisocyanate in an amount suitable for effecting polymerization;
  A2) At least one diacrylate ester of bisphenol A diglycidyl ether;
  A3) At least one hydrophilic carboxylic acid that contains at least two hydroxy groups selected from the group consisting of glycolic acid and dimethylolpropionic acid;
  A4) At least one high molecular weight polyester diol compound;
  A5) At least one $C_2$-$C_4$ alkanediol;
  A6) Isophorone diamine (IPDA); and
  A7) Diethylene triamine (DETA); and
B) Water.

Optional Constituents

Another preferred embodiment of the invention relates to a coating composition, which comprises additional additives selected from the group consisting of agents for effecting neutral or approximately neutral conditions, reactive diluents and other customary coating additives, such as dispersion additives, levelling agents, or thickeners.

Suitable agents for neutral or approximately neutral conditions include organic and inorganic bases, such as alkali metal and alkaline earth metal hydroxides, such as sodium hydroxide, oxides, carbonates, and hydrogencarbonates, and also ammonia or primary, secondary or tertiary amines. Preference is given to complete or partial neutralization with metal hydroxides, such as sodium hydroxide, and amines, such as and in particular with tertiary amines, such as triethylamine, triethanolamine, dimethylethanolamine or diethylethanolamine. The amount of chemically bonded acid groups introduced, and the extent of neutralization of the acid groups, which is usually 40% to 100% of the equivalent basis, should be sufficient enough to ensure that the polyurethane component A) is dispersed in the aqueous medium.

The coating composition according to the invention comprises as optional components reactive diluents or mixtures thereof. Suitable reactive diluents as described in P. K. T. Miring (editor), *Chemistry & Technology of UV & EB Formulations for Coatings, Inks & Paints*, Vol. II, Chapter III: *Reactive Diluents for UV & EB Curable Formulations*, Wiley and SITA Technology, London 1997.

Examples of suitable reactive diluents include:

Esters of (meth)acrylic acid with alcohols which have 1 to 20 C-atoms, e.g., methyl (meth)acrylate, ethyl (meth)acrylate, butyl (meth)acrylate, 2-ethylhexyl (meth)acrylate, 2-hydroxyethyl (meth)acrylate, 2-hydroxypropyl (meth)acrylate, 4-hydroxybutyl acrylate, dihydrodicyclopentadienyl acrylate;

Compounds having at least two free-radically polymerizable C=C double bonds, such as the dieters and polyesters of α,β-ethylenically unsaturated monocarboxylic and/or dicarboxylic acids with diols or polyols.

Preferred are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythritol diacrylate, dipentaerythritol tetraacrylate, dipentaerythritol triacrylate, pentaerythritol tetraacrylate, etc. Also preferred are the esters of alkoxylated polyols with α,β-ethylenically unsaturated monocarboxylic and/or dicarboxylic acids, such as, for example, the polyacrylates or polymethacrylates of alkoxylated trimethylolpropane, glycerol or pentaerythritol. Additionally suitable are the esters of alicyclic diols, such as cyclohexanediol di(meth)acrylate and bis(hydroxymethylethyl)cyclohexane di(meth)acrylate. Further suitable reactive diluents are trimethylolpropane mono-formal acrylate, glycerol formal acrylate, 4-tetrahydropyranyl acrylate, 2-tetrahydropyranyl methacrylate, and tetrahydrofurfuryl acrylate.

Further suitable reactive diluents are, for example, polyether (meth)acrylates.

Such polyether (meth)acrylates are preferably (meth)acrylates of ethoxylated, propoxylated or mixedly ethoxylated and propoxylated, neopentylglycol, trimethylolpropane, trimethylolethane or pentaerythritol.

Suitable polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyesterpolyol acrylates, polyetherol acrylates, and the triacrylate of ethoxylated, trimethylolpropane.

Polyether (meth)acrylates may also be (meth)acrylates of polyTHF having a molar weight between 162 and 2000, poly-1,3-propanediol having a molar weight between 134 and 2000 or polyethylene glycol having a molar weight between 238 and 2000.

Hydroxyalkyl (meth)acrylates as compounds are, for example, compounds having at least one, preferably just one hydroxyl group and at least one, 1 to 5 for example, preferably 1 to 4, more preferably 1 to 3, very preferably 1 or 2, and more particularly just one (meth)acrylate group, preferably ω-hydroxyalkyl (meth)acrylates or (ω-1)-hydroxyalkyl (meth)acrylates, preferably ω-hydroxyalkyl (meth)acrylates.

Representative examples are 2-hydroxyethyl acrylate, 2-hydroxypropyl acrylate, 3-hydroxypropyl acrylate, 2-hydroxypropyl methacrylate, 2-hydroxyethyl methacrylate, 4-hydroxybutyl acrylate, pentaerythritol triacrylate or trimethylolpropane dimethacrylate, more preferably 2-hydroxyethyl acrylate, 2-hydroxypropyl acrylate, 2-hydroxypropyl methacrylate, 4-hydroxybutyl acrylate or 2-hydroxyethyl methacrylate, and very preferably 4-hydroxybutyl acrylate, 2-hydroxyethyl acrylate, 2-hydroxypropyl acrylate or 2-hydroxyethyl methacrylate.

N-Vinyl lactams are preferably N-vinylated lactams having five- to twelve-membered ring systems, preferably five- to ten-membered and more preferably five- to seven-membered ring systems.

Preferred N-vinyl lactams are N-vinylpyrrolidone or N-vinylcaprolactam.

Other reactive diluents different from the reactive diluents mentioned above.

Suitable polyfunctional (meth)acrylates are having a functionality of at least 2, 2 to 10, for example, preferably 2 to 6, more preferably 2 to 5, and very preferably 2 to 4.

Reactive diluents of this type are known per se to the skilled person. They include, for example, the reactive diluents as described in the literature mentioned above.

Suitable dispersion additives are surfactants on the basis of ethoxylated or propoxylated long chain or oxoalcohols, propyleneoxide/ethyleneoxide block copolymers, ethoxylated oleic acid or acrylic block copolymer or alkylphenols, alkylphenol ethersulphates, alkylpolyglycosides, alkylphosphonates, alkylphenylphosphonates, alkylphosphates, alkylphenylphosphates or polyethersiloxane copolymers, particularly alkoxylated 2-(3-hydroxypropyl) heptamethyltrisiloxanes, suitably composed of blocks of 7 to 20, particularly 7 to 12, ethyleneoxide units and blocks of 2 to 20, particularly 2 bis 10 propyleneoxide units. These dispersion additive are suitably present in the coating composition in weight percent amounts from 0.05 to 1.00 wt.-%.

Thickeners known in the art are also suitable such as aqueous dispersion of polymers based on polyethers of the type Rheovis®, such as RHEOVIS PE 1330.

The compositions according to the invention may comprise further customary coatings adjuvants, such as photo-initiators, flow control agents, defoamers, UV absorbers, dyes, pigments and/or fillers. Suitable fillers comprise silicates, e.g., silicates obtainable by hydrolysis of silicon tetrachloride, such as Aerosil® from Degussa, siliceous earth, talc, aluminum silicates, magnesium silicates, and calcium carbonates, etc.

Suitable photo-initiators are capable of initiating the polymerization of ethylenically unsaturated double bonds upon exposure to UV-radiation and are known to the skilled person, examples being those specified in *Advances in Polymer Science*, Volume 14, Springer Berlin 1974 or in K. Dietliker, *Chemistry and Technology of UV and EB Formulation for Coatings, Inks and Paints*, Volume 3; *Photo-initiators for Free Radical and Cationic Polymerization*, P. K. T. Oldring (Eds), SITA Technology Ltd, London.

For pigmented systems, it is state of the art to apply two different kinds of photo-initiators, one to achieve surface hardening and one for hardening in depth.

Representative examples are mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO (BASF SE)), ethyl 2,4,6-trimethylbenzoylphenylphosphinate (Lucirin® TPO L (BASF SE)), bis(2,4,6-trimethylbenzoyl)phenylphosphine oxide (Irgacure® 819 (BASF SE)), benzophenones, hydroxyacetophenones, phenylglyoxylic acid and its derivatives, or mixtures of these photo-initiators, such as photo-initiator based on benzophenone and 1-hydroxy-cyclohexyl-phenyl-keton (Irgacure® 500).

Examples that may be mentioned include benzophenone, acetophenone, acetonaphthoquinone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxan-thone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-aceton-aphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are non-yellowing or low-yellowing photo-initiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hy-droxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclo-hexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-tri-methylbenzophenone, and 4-methylbenzophenone and 2,4,6-trimethylbenzoyldiphenylphosphine oxide.

Preference among these photo-initiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The pigmented coating compositions of the invention comprise the photo-initiators preferably in an amount of 0.05% to 5.0%, depending on the solid content of the coating, more preferably 0.5% to 3.0%, in particular 0.2% to 1.5%, by weight based on the total amount of components present in the composition. For aqueous dispersions an amount of 3.0-4.0, calculated on the solid content of the compositions, is used.

Suitable stabilizers comprise typical UV absorbers such as oxanilides, triazines, and benzotriazole (the latter obtainable as Tinuvin® grades from Ciba Specialty Chemicals, now BASF), and benzophenones. They can be used alone or together with suitable radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1 to 5.0 wt %, based on the "solid" components comprised in the preparation.

A further embodiment relate to the water-dispersible polyurethane A) obtainable by polymerization of:
- A1) At least one aromatic, cycloaliphatic or aliphatic diisocyanate or polyisocyanate compound in an amount suitable for effecting polymerization;
- A2) At least one ethylenically unsaturated compound that contains at least two reactive groups capable of reacting with isocyanate groups;
- A3) At least one hydrophilic carboxylic acid that contains at least one reactive group capable of reacting with isocyanate groups and effecting dispersion of the polyurethane component A) in the aqueous phase;
- A4) At least one high molecular weight polyester polyol compound;
- A5) At least one low molecular weight alcohol that has at least two hydroxy functions;
- A6) At least one polyfunctional diamine compound; and
- A7) At least one polyfunctional polyamine compound that has at least three amino groups.

Components A1)-A7) correspond to the ones as defined above with regard to the composition of the invention.

The compositions of the invention are prepared by conventional mixing procedures and are particularly suitable as coating material or in coating materials, more preferably for coating substrates such as wood, paper, textile, leather, non-woven, plastics surfaces, glass, ceramic, mineral building materials, such as cement molding and fibre-cement slabs, and, in particular, for coating metals or coated metals.

The polyurethane component A) is preferably composed of the molar weight amount range from 1 000-100 000 g/mol (pre-polymer) of at least one aromatic, cycloaliphatic or aliphatic di-isocyanate or polyisocyanate compound A1) and the molar weight percentage ranges of components A2)-A7), based on the amount of the isocyanate component A1):

The polyurethane component A) is preferably composed of the weight percentage ranges of components A2)-A7), based on the amount of the isocyanate component A1), 110.0 to 145.0 wt. %, preferably 120.0 wt. % to 140.0 wt. %, most preferably 120.0 wt. % to 135.0 wt. %, of at least one ethylenically unsaturated compound A2) that contains at least two reactive groups;

11.0 to 16.0 wt. %, preferably 11.0 wt. % to 15.0 wt. %, most preferably 13.0 wt. % to 14.0 wt. % of at least one hydrophilic carboxylic acid A3) that contains at least one reactive group;

70.0 to 90.0 wt, preferably 75.0 wt. % to 83.0 wt. %, most preferably 77.0 wt. % to 81.0 wt. % of at least one high molecular weight polyester polyol compound A4);

4.0 to 6.0 wt. %, preferably 4.5 wt. % to 5.5 wt. %, most preferably 5.0 wt. % to 5.45 wt. % of at least one low molecular weight alcohol A5) that has at least two hydroxy functions; and 2.5 to 3.5 wt. %, preferably 2.7 wt. % to 3.2 wt. %, most preferably 2.9 wt. % to 3.0 wt. % of a mixture (combination) of
- A6) At least one polyfunctional diamine compound; and
- A7) At least one polyfunctional polyamine compound that has at least three amino groups.

The compositions of the invention can be used with particular advantage for coating wood and wood base materials and wood-containing substrates, such as fibre-board. Also conceivable is the coating of substrates containing cellulose fibre, such as paper, paperboard, or cardboard, for example. With very particular preference the dispersions are suitable for the coating of oak, spruce, pine, beech, maple, walnut, macoré, chestnut, plane, robinia, ash, birch, stone pine, and elm, and also cork.

A further embodiment of the invention relates to the process for preparing a chain extended and cross linked water-dispersible polyurethane A), which comprises polyaddition of constituents A1) to A5), dispersing the resulting pre-polymer in water and crosslinking it with constituents A6), A7). The optional addition of the above-mentioned additives and reactive diluent during the above mentioned process is possible.

A preferred embodiment of the invention relates to a process for preparing a chain extended and cross linked water-dispersible polyurethane A), which comprises polymerizing in solution the constituents:
- A1) At least one aromatic, cycloaliphatic or aliphatic diisocyanate or polyisocyanate compound in an amount suitable for effecting polymerization;
- A2) At least one ethylenically unsaturated compound that contains at least two reactive groups capable of reacting with isocyanate groups;
- A3) At least one hydrophilic carboxylic acid that contains at least one reactive group capable of reacting with isocyanate groups and effecting dispersion of the polyurethane component A) in the aqueous phase;
- A4) At least one high molecular weight polyester polyol compound; and
- A5) At least one low molecular weight alcohol that has at least two hydroxy functions; and
dispersing the polyurethane obtained with a mixture of
- A6) At least one aromatic, cycloaliphatic or aliphatic diamine compound; and
- A7) At least one aliphatic triamine compound; and
adding additional agents suitable for effecting neutral or approximately neutral conditions.

A preferred embodiment relates to the process, as defined above, which comprises polymerizing in solvent the constituents A1)-A5) and dispersing the polyurethane obtained in water with a mixture of
- A6) At least one aromatic, cycloaliphatic or aliphatic diamine compound; and
- A7) At least one aliphatic triamine compound.

Additional additives selected from the group consisting of agents for effecting neutral or approximately neutral conditions, reactive diluents and other customary coating additives, such as dispersion additives, levelling agents, or thickeners.

In accordance with the process of the invention, when preparing the polyurethane A), components A2)-A5) are mixed subsequently completely, and the isocyanate component A1) is added to this mixture of the components introduced.

The reaction mixture is processed at temperatures of 25° to 100° C., preferably 40° to 90° C., over a period of 3 to 20 hours, preferably at 5 to 12 hours, with stirring or circulatory pumping.

In the event that a solvent of a low boiling point is used, such as acetone, the reaction is carried out in a pressurized vessel at temperatures above room temperature, particularly above 50° C.

During the process, the temperature may stay the same or may be increased continuously or in steps.

The mixture of components A6) and A7) is added when the residual NCO value of the reaction mixture has dropped below 3.0% and resin is neutralized and dispersed in water. Reaction is then allowed to continue on for at least 15 minutes, preferably at least 30 minutes, and more preferably at least 45 minutes, at a temperature of 40 to 80° C.

The reaction is preferably accelerated by addition of a suitable catalyst. Such catalysts are known from the literature, as for example from G. Oertel (editor), *Polyurethane*, 3rd edition 1993, Carl Hanser Verlag, München-Wien, pages 104 to 110, section 3.4.1. "Katalysatoren"; preferred are organic amines, more particularly tertiary aliphatic, cycloaliphatic, or aromatic amines, Brønsted acids and/or Lewis-acidic organometallic compounds, with Lewis-acidic organometallic compounds being particularly preferred. Preferably these are Lewis-acidic organometallic compounds, for which, for example, tin compounds are suitable, such as, for example, tin(II) salts of organic carboxylic acids, examples being tin(II) diacetate, dioctoate, bis(ethylhexanoate), and tin(II) dilaurate, and the dialkyltin(IV) salts of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. It is possible, moreover, to use zinc(II) salts, such as zinc(II) dioctoate, for example.

Metal complexes are possible as well, such as acetyl acetonates of iron, titanium, aluminum, zirconium, manganese, nickel, zinc, and cobalt.

Other metal catalysts are described by Blank et al. in *Progress in Organic Coatings*, 1999, vol. 35, pages 19-29.

Tin-free and zinc-free alternatives used include compounds of zirconium, of bismuth, of titanium, and of aluminum. These are, for example, zirconium tetraacetylacetonate (e.g., K-KAT® 4205 from King Industries), zirconium dionates (e.g., K-KAT® XC-9213, XC-A 209, and XC-6212 from King Industries), and aluminum dionate (e.g., K-KAT® 5218 from King Industries).

Suitable zinc compounds and bismuth compounds include those containing the following anions: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and where n stands for the numbers 1 to 20. Preference here is given to the carboxylates in which the anion conforms to the formulae $(C_nH_{2n-1}O_2)^-$ and $(C_{n+1}H_{2n-2}O_4)^{2-}$ with n being 1 to 20. Particularly preferred salts have monocarboxylate anions of the general formula $(C_nH_{2n-1}O_2)^-$, where n stands for the numbers 1 to 20. Particularly noteworthy in this context are formate, acetate, propionate, hexanoate, neodecanoate, and 2-ethylhexanoate.

Among the zinc catalysts the zinc carboxylates are preferred, more preferably those of carboxylates which have at least six carbon atoms, very preferably at least eight carbon atoms, more particularly zinc(II) diacetate or zinc(II) dioctoate or zinc(II) neodecanoate. Commercially available catalysts are, for example, Borchi® Kat 22 from OMG Borchers GmbH, Langenfeld, Germany.

Among the bismuth catalysts the bismuth carboxylates are preferred, more preferably those of carboxylates which have at least six carbon atoms, more particularly bismuth octoates, ethylhexanoates, neodecanoates, or pivalates; examples include K-KAT 348, XC-B221, XC-C227, XC 8203, and XK-601 from King Industries, TIB KAT 716, 716LA, 716XLA, 718, 720, 789 from TIB Chemicals, and those from Shepherd Lausanne, and also, for example, Borchi® Kat 24, 315, and 320 from OMG Borchers GmbH, Langenfeld, Germany.

Mixtures of different metals, as in Borchi® Kat 0245 from OMG Borchers, are, for example, suitable.

Among the titanium compounds the titanium tetraalkoxide $Ti(OR)_4$ are preferred, more preferably those of alcohols ROH having 1 to 8 carbon atoms, examples being methanol, ethanol, isopropanol, n-propanol, n-butanol, isobutanol, sec-butanol, tert-butanol, n-hexanol, n-heptanol, and n-octanol, preferably methanol, ethanol, isopropanol, n-propanol, n-butanol, and tert-butanol, more preferably isopropanol and n-butanol.

These catalysts are suitable for solvent-based, water-based and/or blocked systems.

Molybdenum, tungsten, and vanadium catalysts are described in particular for the reaction of blocked polyisocyanates in WO 2004/076519 and WO 2004/076520.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zinc(II) dioctoate, zirconium acetylacetonate, zirconium 2,2,6,6-tetramethyl-3,5-heptanedionate, and bismuth 2-ethylhexanoate.

Particularly preferred, however, are dibutyltin dilaurate, bismuth neodecanoate, and bismuth 2-ethylhexanoate; bismuth neodecanoate and bismuth 2-ethylhexanoate are especially preferred.

It is possible to boost the activity of the catalysts additionally through the presence of acids—by means, for example, of acids having a pKa of <2.5, as described in EP 2316867 A1, or having a pKa of between 2.8 and 4.5, as described in WO 04/029121 A1. The use is preferred of acids having a pKa of not more than 4.8, more preferably of not more than 2.5.

In order to prevent unwanted polymerization of the (meth) acrylate groups during the reaction, polymerization inhibitors may be added. Inhibitors of this kind are described for example in WO 03/035596, page 5, line 35 to page 10, line 4.

A preferred embodiment of the present invention may comprise the use of incorporable polymerization inhibitors, i.e., inhibitors which comprise an —OH or —NH$_2$ group, that is, an isocyanate-reactive group. One preferred example of such inhibitors is 4-hydroxy-2,2,6,6-tetramethylpiperidin-N-oxyl (TEMPO) or 2,6-di-tert-butyl-p-kresol.

The reaction may be considered at an end when the NCO value has attained the theoretical conversion value of at least 95.0 wt.-%, preferably at least 97.0 wt.-%, and more preferably at least 98.0-99.0 wt.-%.

Following its preparation, the reaction mixture is dispersed or diluted in water.

The solids content usually set in this case is from 35.0 wt. % to 45.0 wt. %, though it may also be up to 55.0 wt.-%.

The average particle size in the dispersion is generally 50 to 200 nm, preferably 90 to 150 nm, more preferably 90 to 120 nm.

The compositions of the invention, after curing by high-energy radiation, advantageously form films having good performance properties, more particularly good hardness with sufficient elasticity, good physical drying and good adhesion.

A further embodiment relates to the method for coating a substrate, wherein the aqueous coating composition, as defined above, is applied to a substrate, subsequently dried and/or radiation-cured.

A preferred embodiment relates to the method, wherein the aqueous coating composition is applied to a substrate, subsequently dried and/or cured under exposure to UV-light energy radiation.

The substrates are coated in accordance with customary methods that are known to the skilled person, involving the application of at least one dispersion of the invention to the substrate that is to be coated, in the desired thickness, and removal of the volatile constituents of the dispersions, by means of drying and/or evaporation at ambient temperature or elevated temperature up to 60° C., for example.

Therefore, the invention relates to the use of a water-dispersible polyurethane A), as defined above, in coating compositions for coating and impregnation of lignin containing substrates and plastics containing substrates.

In particular, the invention relates to the use of a water-dispersible polyurethane A), as defined above, in coating compositions for coating metals and metallic surfaces, polymers and polymer surfaces, wood, wood-base materials, wood-containing substrates, cellulose fibres and paper raw materials.

The use of a water-dispersible polyurethane A), as defined above, in coating compositions for adhesion priming of parquet, veneer surfaces of furniture, cork and compressed wood-base materials is a particularly preferred embodiment of the invention.

The coating process can be repeated one or more times if desired. Application to the substrate may take place in a known way, e.g., by spraying, troweling, knife-coating, brushing, rolling, roller-coating or pouring. The coating thickness is generally situated within a range from about 3 to 1000 g/m$^2$ and preferably 10 to 200 g/m$^2$.

Optionally, if two or more films of the coating material are applied one on top of another, a radiation cure may take place after each coating operation.

Radiation curing is accomplished by exposure to high-energy radiation, i.e., UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash light), halogen lamps or excimer emitters. The radiation dose normally sufficient for crosslinking in the case of UV curing is situated within the range from 80 to 3000 mJ/cm$^2$.

Irradiation may also, optionally, be carried out in the absence of oxygen, e.g., under an inert gas atmosphere. Suitable inert gases include, preferably, nitrogen, noble gases, carbon dioxide or combustion gases. Irradiation may also take place with the coating material being covered by transparent media. Transparent media are, for example, polymeric films, glass or liquids, e.g., water. Particular preference is given to irradiation in the manner as is described in DE-A1 199 57 900.

In one preferred process, curing takes place continuously, by passing the substrate treated with the preparation of the invention at constant speed past a radiation source. For this it is necessary for the cure rate of the preparation of the invention to be sufficiently high.

This varied course of curing over time can be exploited in particular when the coating of the article is followed by a further processing step in which the film surface comes into direct contact with another article or is worked on mechanically.

The advantage of the dispersions of the invention is seen in the fact that the coated articles can be further processed immediately after the radiation cure, since the surface is no longer tacky and shows especially before UV curing a very good physical drying and hardness. Moreover, the dried film is still so flexible and extensible that the article can still be deformed without the film cracking.

The following Examples illustrate the invention:

1 Materials and Methods
1.1 Preparation of UV-Curable Dispersions
1.1.1 UV-Curable Dispersion A1

25.54 g Dimethylol propionic acid, 10.14 g butane diol, 151.16 g aliphatic polyesterpolyol Lupraphen®6605/2 [BASF SE, polymer based on aliphatic alcohol (1,4-butanediol) and aliphatic dicarboxylic acid (hexanedioic acid)], 249.44 g epoxy acrylate oligomer Ebecryl® 600 [Cytec Industries Inc., diacrylate ester of bisphenol A epoxy resin], 192.40 g isophorone diisocyanate, 0.63 g 2,6-di-tert-butyl-p-kresol (Kerobit® TBK) and 0.06 g 4-hydroxy-2,2,6,6-tetramethylpiperidine-1-oxyl (4-hydroxy-TEMPO) are given to a stirring vessel. The mixture is diluted by addition of 170 g acetone. 0.06 g Bismuth neodecanoate (BorchiKAT® 315, OMG Borchers) is added, and the mixture is heated to 80° C. The progress of the reaction is monitored by measurement of residual NCO. At the level of 0.6-0.8 wt.-% of residual NCO, the reaction mixture is further diluted by addition of 300 g acetone. 45.74 g NaOH-solution (10 wt.-% in water), 835 g deionized water, 1.64 g diethylenetriamine and 4.08 g isophoronediamine are added sequentially.

After distilling off the solvent mixture and adding further 150 g of deionized water, the polyurethane is obtained as a dispersion in water with a solid content of 39.5 wt.-%. The dynamic viscosity of the dispersion is 26 mPas (as determined with Rheomat®).

1.1.2 UV-Curable Dispersion A2

30.93 g Dimethylol propionic acid, 13.22 g butane diol, 124.73 g LUPRAPHEN 6605/2 and 81.07 g LUPRAPHEN VP 9186 (LUPRAPHEN VP 9186: mol.-wt. 2450 g/mol), 302.07 g epoxy acrylate oligomer EBECRYL 600, 256.29 g isophorone diisocyanate, 0.81 g 2,6-di-tert-butyl-p-kresol (KEROBIT TBK) and 0.08 g 4-hydroxy-TEMPO are given to a stirring vessel. The mixture is diluted by addition of 90.00 g acetone. 0.81 g catalyst (BORCHIKAT 315) is added, and the mixture is heated to 60° C. The progress of the reaction is monitored by measurement of residual NCO. At the level of 0.6-0.9 wt.-% of residual NCO, the reaction mixture is further diluted by addition of 400 g acetone. 24.03 g N-Methyldiethanolamine, 1150 g deionized water, 2.12 g diethylenetriamine and 5.27 g isophorone diamine are added sequentially.

After distilling off the solvent mixture and adding further 150 g of deionized water, the polyurethane is obtained as a dispersion in water with a solid content of 40.4 wt.-%. The dynamic viscosity of the dispersion is 120 mPas (as determined with Rheomat®).

1.1.3 UV-Curable Dispersion A3

22.98 g Dimethylol propionic acid, 9.12 g butane diol, 136.02 g LUPRAPHEN 6605/2 224.45 g BISPHENOL A epoxy acrylate oligomer Miramer® PE 210 (MIWON Speciality Chem. Co. ltd), 173.12 g isophorone diisocyanate, 0.57 g 2,6-di-tert-butyl-p-kresol (KEROBIT TBK) and 0.06 g 4-hydroxy-TEMPO are given to a stirring vessel. The mixture is diluted by addition of 153.00 g acetone. 0.68 g Catalyst BORCHIKAT 315 is added, and the mixture is heated to 60° C. The progress of the reaction is monitored by measurement of residual NCO. At the level of 0.6-1.0 wt.-% of residual NCO, the reaction mixture is further diluted by addition of 198 g acetone. 5.18 g Laromer® LR 8967 is added. The mixture is neutralized by adding 41.16 g of 10% NaOH. 632.25 g deionized water and 1.48 g diethylenetriamine and 3.67 g isophoronediamine in 45 g deionized water are added sequentially.

After distilling off the solvent mixture and adding further 210.38 g of deionized water, the polyurethane is obtained as a dispersion in water with a solid content of 41.3 wt.-%. The dynamic viscosity of the dispersion is 51 mPas (as determined with Rheomat®).

1.1.4 UV-Curable Dispersion A4

21.74 g Dimethylol propionic acid, 8.63 g butane diol, 128.69 g LUPRAPHEN 6605/2 212.36 g epoxy acrylate oligomer Miramer® PE 210, 194.28 g Desmodur® W, 0.57 g KEROBIT TBK and 0.06 g 4-hydroxy-TEMPO are given to a stirring vessel. The mixture is diluted by addition of 153.00 g acetone. 0.68 g catalyst BORCHIKAT 315 is added, and the mixture is heated to 60° C. The progress of the reaction is monitored by measurement of residual NCO. At the level of 0.6-1.0 wt.-% of residual NCO, the reaction mixture is further diluted by addition of 198 g acetone. 5.18 g reactive diluent LAROMER LR 8967 is added. The mixture is neutralized by adding 38.93 g of 10.0% NaOH. 632.25 g deionized water and 1.48 g diethylenetriamine and 3.67 g isophoronediamine in 45.0 g deionized water are added sequentially.

After distilling off the solvent mixture and adding further 210.38 g of deionized water, the polyurethane is obtained as a dispersion in water with a solid content of 39.2 wt.-%. The dynamic viscosity of the dispersion is 22.0 mPas (as determined with Rheomat®).

1.1.5 UV-Curable Dispersion A5

The UV-curable dispersion A5 is prepared in a manner analogous to Example 1.1.3 by using the same amounts of components, with the exception that no chain extending diethylene triamine is added.

1.1.6 UV Curable Dispersion A6

The UV-curable dispersion A5 is prepared in a manner analogous to Example 1.1.4 by using the same amounts of components, with the exception that no reactive diluent LR 8967 is added.

1.2 Preparation of Clear Coat Formulations and UV-Cured Films

1.2.1 Clear Coat Formulations

UV-curable dispersions (1.1.1) and (1.1.2) 38.0-40.0% solid content,
4.0% Irgacure® 500 (BASF SE),
0.2% Rheovis® PE 1330 (BASF SE)

The UV-curable dispersions (1.1.1) and (1.1.2) are adjusted, to a solid content of 38.0-40.0% by addition of water. The amounts corresponding to 4.0% IRGACURE 500 (solid on solid) and 0.2% RHEOVIS PE 1330 are added to 500 g of the dispersions, drop-wise under stirring for 15 min. at 1200 rpm with a laboratory stirrer (Dispermat®). The resulting clear coat formulation is applied with a 200 μm draw down bar on the substrate and is dried for 10 min. at room temperature and, subsequently, for 20 min. at 60° C. in a drying cabinet. The coating film is exposed to 1×5 in with the Hg-lamp at the dose of 1173 mJ/cm$^2$.

1.2.2 Clear Coat Formulations (Vickers)

Proceed as in 1.2.1. The resulting clear coat formulation is applied with a 300 μm draw down bar on a glass substrate and dried for 15 min. at room temperature and, subsequently, for 30 min. at 60° C. in a drying cabinet. The coating film is exposed for 1×5 m/min with the Hg-lamp at the dose of 1173 mJ/cm$^2$.

1.3. Preparation of Pigment Coat Formulations and UV-Cured Films 50.0 g UV-curable dispersions (1.1.1) and (1.1.2) 38.0-40.0% solid content,
20.2 g Luconyl® NG White 022 (BASF SE, form of delivery: 63% pigment concentration),
2.4 g LUCONYL NG Yellow 1256 (BASF SE, form of delivery: 50% pigment concentration),
0.6 g IRGACURE 500 (BASF SE, for of delivery 100%).
0.6 g IRGACURE 819 DW (BASF SE, form of delivery 50%),
0.2 g RHEOVIS PE 1330.

The UV-curable dispersions (1.1.1) and (1.1.2) are adjusted to a solid content of 38.0-40.0% by addition of water. The pigments LUCONYL NG White 022 and LUCONYL NG Yellow 1256, the photo-initiator IRGACURE 819 DW and RHEOVIS PE 1330 are added to 50.0 g of the dispersions, drop-wise under stirring for 15 min. at 1200 rpm with a laboratory stirrer (DISPERMAT). The dispersion is stirred for 15 min at 1200 rpm and IRGACURE 500 is added drop-wise.

The resulting pigment coat formulation is applied with a 200 μm draw down bar on the substrate and is dried for 10 min. at room temperature and, subsequently, for 20 min. at 60° C. in a drying cabinet. The coating film is exposed for 1×5 m with the Hg-lamp and Ga-lamp at the dose of 1890 mJ/cm$^2$.

1.4. Preparation of Pigment Coat Formulations and UV-Cured Films (Vickers)

Proceed as in 1.3. The resulting pigment coat formulation is applied with a 300 μm draw down bar on the glass substrate and is dried for 15 min. at room temperature in a drying cabinet for 15 min. at room temperature and, subsequently, for 20 min. at 60° C. in a drying cabinet. The coating film is exposed for 1×5 m/min with the Hg-lamp and Ga-lamp at the dose of 1890 mJ/cm$^2$.

1.5 Preparation of Clear Coat Formulations, Pigmented Coat Formulations and UV-Cured Films Based Thereon from Prior Art UV-Curable Dispersions For purposes of comparison clear coat formulations and LTV-cured films, as well as pigmented coat formulations and UV-cured films, are prepared from commercially available UV-curable dispersions by methods analogous to the ones described above:

LAROMER UA 906 (B1, aqueous polymer dispersion based on acrylates, polyurethane),
LAROMER UA 9005 (B2, commercially available dispersion, UV-curable, aromatic polyurethane dispersion),
LAROMER UA 8949 (B3, commercially available dispersion, water-borne polymer dispersion based on acrylates, polyurethane).
LAROMER UA 9095 (B4, commercially available dispersion, water-borne polymer dispersion based on acrylates, polyurethane)

2 Results

TABLE 1

Properties of UV-curable clear coat compositions compared with commercial compositions

| Test Method/Properties | UV-curable Dispersion A-1 (Invention) | Commercial Composition B-1 | Commercial Composition B-2 | Commercial Composition B-3 | Commercial Composition B-4 |
|---|---|---|---|---|---|
| Double Bond Density [mol/kg] | 1.51 | 2.21 | 3.02 | 1.62 | 7.14 |
| Pendulum Hardness before UV-curing [swings] | 70 | 10 | 14 | 13 | 7 |
| Pendulum Hardness after UV-curing [swings] | 111 | 128 | 136 | 114 | 121 |
| Erichsen Cupping [mm] | 6.9 | 4.8 | 3.3 | 5.6 | 4.9 |

TABLE 2

Application results of clear coat compositions compared with commercial compositions before and after UV-curing

| Test Method/Properties | UV-curable Dispersion A-1 (Invention) | Commercial Composition B-1 | Commercial Composition B-2 | Commercial Composition B-3 | Commercial Composition B-4 |
|---|---|---|---|---|---|
| *Chemical Resistance before UV-curing* | | | | | |
| Coffee [16 hours] after 24 hours | 4 | 1 (etched) | 1 (etched) | 1 (etched) | 1 (etched) |
| Water [16 hours] after 24 hours | 4 | 1 (etched) | 1 (etched) | 1 (etched) | 1 (etched) |
| Alcohol (48%) [1 hour] | 1 (etched) | 1 (detached) | 1 (detached) | 1 (detached) | 1 (detached) |
| *Chemical Resistance after UV-curing* | | | | | |
| Coffee [16 hours] after 24 hours | 5 | 5 | 5 | 5 | 5 |
| Water [16 hours] after 24 hours | 5 | 5 | 5 | 5 | 5 |
| Alcohol (48%) [1 hour] | 5 | 2 | 5 | 4 | 5 |

TABLE 3

Application results of clear coat compositions compared with commercial compositions before and after UV-curing in the Vickers hardness test

| Test Method/Properties | UV-curable Dispersion A-1 (Invention) | Commercial Composition B-1 | Commercial Composition B-2 | Commercial Composition B-3 | Commercial Composition B-4 |
|---|---|---|---|---|---|
| *Hardness before UV-curing* | | | | | |
| Hardness HU [N/mm$^2$] | 94 | 14 | 10 | 10 | 15 |
| *Hardness after UV-curing* | | | | | |
| Hardness HU [N/mm$^2$] | 151 | 229 | 292 | 182 | 189 |

TABLE 4

Properties of UV-curable pigment coat compositions compared with commercial compositions

| Test Method/Properties | UV-curable Dispersion A-1 (Invention) | Commercial Composition B-1 | Commercial Composition B-2 | Commercial Composition B-3 | Commercial Composition B-4 |
|---|---|---|---|---|---|
| Double Bond Density [mol/kg] | 1.51 | 2.21 | 3.02 | 1.62 | 2.14 |
| Pendulum Hardness before UV-curing [swings] | 17 | 3 | 4 | 1 | 2 |
| Pendulum Hardness after UV-curing [swings] | 22 | 11 | 10 | 7 | 10 |
| Erichsen Cupping [mm] | >9 | >9 | >9 | >9 | >9 |

TABLE 5

Application results of pigment coat compositions compared with commercial compositions after UV-curing

| Chemical Resistance after UV-curing | | | | | |
|---|---|---|---|---|---|
| Coffee [16 hours] after 24 hours | 2 | 1 | 1 | 1 | 1 |
| Water [16 hours] after 24 hours | 2 | 1 | 1 | 1 | 1 |
| Alcohol (48%) [1 hour] | 1 | 1 | 1 | 1 | 1 |

TABLE 6

Application results of clear coat compositions compared with commercial compositions before and after UV-curing in the Vickers hardness test

| Test Method/Properties | UV-curable Dispersion A-1 (Invention) | Commercial Composition B-1 | Commercial Composition B-2 | Commercial Composition B-3 | Commercial Composition B-4 |
|---|---|---|---|---|---|
| Hardness before UV-curing | | | | | |
| Hardness HU [N/mm$^2$] | 23 | 7 | 8 | 8 | 8 |
| Hardness after UV-curing | | | | | |
| Hardness HU [N/mm$^2$] | 23 | 8 | 7 | 6 | 10 |

TABLE 7

Application results of clear coat and pigmented compositions compared with H12MDI (Desmodur ® W: 1-Isocyanato-4-[(4-isocyanatocyclohexyl)methyl]cyclohexane) based systems before and after UV-curing

| Additive tested | DESMODUR W | | IPDI (Isophoronediisocyanate) | |
|---|---|---|---|---|
| Dispersion | UV curable Dispersion A4 | | UV curable Dispersion. A3 | |
| Formulation | Clear coat | Pigmented Coating | Clear coat | Pigmented Coating |
| Pendulum hardness before UV-curing [swings] | 98 | 88 | 110 | 82 |
| Appearance on glass | Disturbed surface | o.k. | Low amount of cracks at the edges | o.k. |
| Film formation on glass | Moderate | | Good | |

Table 7 shows the impact of included isocyanate compound. Use of IPD1 in higher hardness of the clear coat film after UV curing and a good film formation

TABLE 8

Application results of clear coat and pigmented compositions compared with system based on not chain extended resin (no diamine) before and after UV-curing

| | Chain extended UV curable Disp. A3 | | Without chain extension UV curable Disp. A5 | |
|---|---|---|---|---|
| Coating | Clear Coat | Pigmented coating | Clear Coat | Pigmented coating |
| Pendulum Hardness before UV-curing [swings] | 60 | 42 | 57 | 43 |
| Pendulum Hardness after UV-curing [swings] | 88 | 78 | 110 | 81 |
| Appearance on glass | Low amount of cracks at the edges | o.k. | Many gel particles: cracks at the edges | o.k. |
| Film formation on glass | Good | | Bad | |

Table 8 demonstrates the impact of chain extension in the resin backbone. Use, of DETA results in higher hardness of the clear coat film after UV curing and a better film formation.

The invention claimed is:

1. An aqueous, radiation curable coating composition, comprising:
    A) at least one water-dispersible polyurethane component consisting of the constituents:

A1) at least one aromatic, cycloaliphatic or aliphatic diisocyanate or polyisocyanate compound in an amount suitable for effecting polymerization;

A2) at least one ethylenically unsaturated compound that contains at least two reactive groups capable of reacting with isocyanate groups;

A3) at least one hydrophilic carboxylic acid that contains at least one reactive group capable of reacting with isocyanate groups and effecting dispersion of the polyurethane component A) in the aqueous phase;

A4) at least one high molecular weight polyester polyol compound;

A5) at least one low molecular weight alcohol that has at least two hydroxy functions;

A6) at least one polyfunctional diamine compound; and

A7) at least one polyfunctional polyamine compound that has at least three amino groups; and B) water.

2. The composition according to claim 1, wherein the A) at least one water-dispersible polyurethane component consists of the constituents:

at least one cycloaliphatic diisocyanate or polyisocyanate compound in an amount suitable for effecting polymerization as the at least one aromatic, cycloaliphatic or aliphatic diisocyanate or polyisocyanate compound of the constituent A1);

at least one reaction product of glycidyl ethers with (meth)acrylic acid as the at least one ethylenically unsaturated compound of the constituent A2);

at least one hydrophilic carboxylic acid that contains at least two hydroxy groups as the at least one hydrophilic carboxylic acid of the constituent A3);

at least one high molecular weight polyester polyol compound obtained by condensation of aliphatic alcohols having two hydroxy functions and aliphatic dicarboxylic acids as the at least one high molecular weight polyester polyol compound of constituent A4);

at least one aliphatic straight chained or branched chained diol compound as the at least one low molecular weight alcohol of the constituent A5);

at least one aromatic, cycloaliphatic or aliphatic diamine compound as the at least one polyfunctional diamine compound of the constituent A6); and at least one aliphatic triamine compound as the at least one polyfunctional polyamine compound of the constituent A7).

3. The composition according to claim 2, wherein the A) at least one water-dispersible polyurethane component consists of the constituents:

isophorone diisocyanate in an amount suitable for effecting polymerization as least one cycloaliphatic diisocyanate or polyisocyanate compound of the constituent A1);

at least one diacrylate ester of bisphenol A diglycidylether as the at least one reaction product of glycidyl ethers with (meth)acrylic acid of the constituent A3);

at least one selected from the group consisting of glycolic acid and dimethylolpropionic acid as the at least one hydrophilic carboxylic acid that contains at least two hydroxy groups of the constituent A3);

the at least one high molecular weight polyester polyol compound obtained by condensation of aliphatic alcohols having two hydroxy functions and aliphatic dicarboxylic acids as the at least one high molecular weight polyester diol compound of constituent A4);

at least one $C_2$-$C_4$ alkanediol as the at least one aliphatic straight chained or branched chained diol compound of the constituent A5);

isophorone diamine (IPDA) as the at least one aromatic, cycloaliphatic or aliphatic diamine compound of the constituent A6); and diethylene triamine (DETA) as the at least one aliphatic triamine compound of the constituent A7).

4. The coating composition according to claim 1, further comprising one or more additional additives selected from the group consisting of agents for effecting neutral or approximately neutral conditions, reactive diluents and other customary coating additives.

5. A substrate coated with the coating composition according to claim 1.

6. A water-dispersible polyurethane A) consisting of constituents A1) to A7), which is obtained by polymerization of the constituents A1) to A7):

A1) at least one aromatic, cycloaliphatic or aliphatic diisocyanate or polyisocyanate compound in an amount suitable for effecting polymerization;

A2) at least one ethylenically unsaturated compound that contains at least two reactive groups capable of reacting with isocyanate groups;

A3) at least one hydrophilic carboxylic acid that contains at least one reactive group capable of reacting with isocyanate groups and effecting dispersion of the polyurethane component A) in the aqueous phase;

A4) at least one high molecular weight polyester polyol compound;

A5) at least one low molecular weight alcohol that has at least two hydroxy functions;

A6) at least one polyfunctional diamine compound; and

A7) at least one polyfunctional polyamine compound that has at least three amino groups.

7. A process for preparing a chain-extended and cross linked water-dispersible polyurethane A) consisting of constituents A1) to A7), the process comprising:

polymerizing in solution the constituents:

A1) at least one aromatic, cycloaliphatic or aliphatic diisocyanate or polyisocyanate compound in an amount suitable for effecting polymerization;

A2) at least one ethylenically unsaturated compound that contains at least two reactive groups capable of reacting with isocyanate groups;

A3) at least one hydrophilic carboxylic acid that contains at least one reactive group capable of reacting with isocyanate groups and effecting dispersion of the polyurethane component A) in the aqueous phase;

A4) at least one high molecular weight polyester polyol compound; and

A5) at least one low molecular weight alcohol that has at least two hydroxy functions; and dispersing the polyurethane obtained with a mixture of A6) at least one aromatic, cycloaliphatic or aliphatic diamine compound; and A7) at least one aliphatic triamine compound;

with the optional addition of one or more additives selected from the group consisting of agents for effecting neutral or approximately neutral conditions, reactive diluents and other customary coating additives.

8. The process according to claim 7, which comprises polymerizing the constituents A1)-A5) in a solvent and dispersing the polyurethane A) obtained with a mixture of A6) at least one aromatic, cycloaliphatic or aliphatic diamine compound; and A7) at least one aliphatic triamine compound.

9. The process according to claim 8, which comprises polymerizing in a solvent the constituents A1)-A5) and dispersing the polyurethane obtained in water with a mixture of A6) isophorone diamine (IPDA); and A7) diethylene triamine (DETA).

10. A method for coating a substrate, wherein the aqueous coating composition according to claim 1 is applied to a substrate, subsequently dried and/or radiation-cured.

11. The method according to claim 10, wherein the aqueous coating composition is applied to a substrate, subsequently dried and/or cured under exposure to UV-light energy radiation.

12. A process comprising coating a lignin-containing substrate or a plastic-containing substrate with the water-dispersible polyurethane A) according to claim 6.

13. A process comprising coating a substrate with the water-dispersible polyurethane A) according to claim 6, wherein the substrate is one or more selected from the group consisting of metals and metallic surfaces, polymers and polymer surfaces, wood, wood-base materials, wood-containing substrates, cellulose fibres and paper raw materials wood.

14. A process comprising adhesion priming a material with the water-dispersible polyurethane A) according to claim 6, wherein the material is one or more selected from the group consisting of parquet, veneer surfaces of furniture, cork and compressed wood-base materials.

* * * * *

UNITED STATES PATENT AND TRADEMARK OFFICE
CERTIFICATE OF CORRECTION

PATENT NO. : 10,584,262 B2
APPLICATION NO. : 15/537103
DATED : March 10, 2020
INVENTOR(S) : Sebastian Berger et al.

It is certified that error appears in the above-identified patent and that said Letters Patent is hereby corrected as shown below:

In the Specification

Column 1, Line 62, "composition" should read -- composition, --.

Column 2, Line 67, "diiso-cyanate" should read -- diisocyanate --.

Column 3, Line 32, "urethonimine" should read -- uretonimine --.

Column 4, Line 12, "same" should read -- some --.

Column 4, Line 14, "Laromert®" should read -- Laromer® --.

Column 4, Line 26, "(Annex)" should read -- (Allnex) --.

Column 4, Line 45, "mol/100 g)." should read -- mol/100 g), --.

Column 5, Line 31, "polyesterdiol" should read -- polyester diol --.

Column 5, Line 31, "synthesized," should read -- synthesized --.

Column 5, Line 40, "Dials" should read -- Diols --.

Column 5, Line 66, "dials" should read -- diols --.

Column 7, Line 7, "ethylenediamine" should read -- ethylenediamine. --.

Column 8, Line 21, "Miring" should read -- Oldring --.

Column 9, Lines 65-66, "K. Dietliker" should read -- K. K. Dietliker --.

Signed and Sealed this
Twentieth Day of October, 2020

Andrei Iancu
*Director of the United States Patent and Trademark Office*

CERTIFICATE OF CORRECTION (continued)
U.S. Pat. No. 10,584,262 B2

Column 10, Line 53, "1-hy-droxycyclohexyI" should read -- 1-hydroxycyclohexyI --.

Column 11, Line 65, "14.0 wt. % of" should read -- 14.0 wt. %, of --.

Column 12, Line 1, "70.0 to 90.0 wt," should read -- 70.0 to 90.0 wt. %, --.

Column 13, Line 34, "dioctoate," should read -- tin(II) dioctoate, tin(II) --.

Column 13, Line 60, "and where" should read -- and $(C_{n+1}H_{2n-2}O_4)^{2-}$, where --.

Column 16, Line 24, "polyesterpolyol" should read -- polyester polyol --.

Column 16, Lines 33-34, "BorchiKAT® 315" should read -- Borchi® Kat 315 --.

Column 17, Line 60, "(BASF SE)" should read -- (BASF SE). --.

Column 17, Line 62, "adjusted, to" should read -- adjusted to --.

Column 17, Line 65, "500 g" should read -- 50.0 g --.

Column 18, Line 3, "1×5 in" should read -- 1×5 m --.

Column 18, Line 20, "for" should read -- form --.

Column 18, Line 20, "100%)." should read -- 100%), --.

Column 18, Line 54, "LTV-cured films" should read -- UV-cured films --.

Column 18, Line 64, "polyurethane)." should read -- polyurethane), --.

Column 18, Line 67, "polyurethane)" should read -- polyurethane). --.

Columns 19-20, Table 1, Line 6, "7.14" should read -- 2.14 --.

Columns 21-22, Table 7, Line 31, "cyclobexane" should read -- cyclohexane --.

Columns 21-22, Table 7, Line 35, "'Dispersion." should read -- Dispersion --.

Column 21, Line 45, "IPD1" should read -- IPDI --.

Column 21, Table 8, Line 63, "81" should read -- 82 --.

Column 21, Table 8, Line 66, "particles:" should read -- particles; --.

Column 22, Line 60, "Use," should read -- Use --.